US011095102B2

(12) United States Patent
Hastings et al.

(10) Patent No.: US 11,095,102 B2
(45) Date of Patent: *Aug. 17, 2021

(54) REPURPOSING PIPELINE FOR ELECTRICAL CABLE

(71) Applicants: QUANTA ASSOCIATES, L.P., Houston, TX (US); William H. Hastings, Portland, ME (US)

(72) Inventors: William H. Hastings, Scottsdale, AZ (US); John Walter Fluharty, II, Naples, FL (US); Herbert Fluharty, Old Mission, MI (US); Daniel Henry Tait, Clare, MI (US); Ronald G. Halderman, Billings, MT (US)

(73) Assignee: Quanta Associates, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/832,526

(22) Filed: Mar. 27, 2020

(65) Prior Publication Data

US 2020/0244053 A1 Jul. 30, 2020

Related U.S. Application Data

(63) Continuation of application No. 16/682,952, filed on Nov. 13, 2019, and a continuation-in-part of (Continued)

(51) Int. Cl.
*H02G 1/08* (2006.01)
*H02G 1/00* (2006.01)
(Continued)

(52) U.S. Cl.
CPC .............. *H02G 1/088* (2013.01); *F16L 55/26* (2013.01); *F16L 2101/50* (2013.01); *H02G 1/005* (2013.01)

(58) Field of Classification Search
CPC .... E21B 7/20; E21B 7/28; E21B 7/04; H02G 1/081; F16L 1/028
(Continued)

(56) References Cited

U.S. PATENT DOCUMENTS 3,471,177 A 10/1969 Garrett et al.
3,753,471 A * 8/1973 Kammerer, Jr. ...... E21B 10/322
175/320
(Continued)

FOREIGN PATENT DOCUMENTS

CA 2235526 A1 10/1998
CA 2653093 A1 12/2007
(Continued)

OTHER PUBLICATIONS

Copenheaver, Blaine R., Notification of Transmittal of the International Search Report and the Written Opinion of the International Searching Authority, or the Declaration for PCT/US2017/050219, dated Feb. 9, 2018, 13 pages, ISA/US, Alexandria, Virginia.
(Continued)

*Primary Examiner* — Edwin J Toledo-Duran
(74) *Attorney, Agent, or Firm* — Oathout Law Firm; Mark A. Oathout

(57) ABSTRACT

The disclosure relates to the field of electric power infrastructure and repurposing existing oil and gas pipeline, or other pipelines which are no longer in use for their original purpose, for installation of conduits and electrical cables/conduits, typically underground, for electric power transmission.

8 Claims, 8 Drawing Sheets

Related U.S. Application Data application No. 16/330,891, filed as application No. PCT/US2017/050219 on Sep. 6, 2017, now Pat. No. 10,914,121.

(60) Provisional application No. 62/887,467, filed on Aug. 15, 2019, provisional application No. 62/877,120, filed on Jul. 22, 2019, provisional application No. 62/384,097, filed on Sep. 6, 2016.

(51) Int. Cl.
*F16L 55/26* (2006.01)
*F16L 101/50* (2006.01)

(58) Field of Classification Search
USPC .... 175/21, 53, 61, 62, 67, 73, 72, 162, 203, 175/320, 325, 350, 406, 424, 184, 94, 92, 175/107, 103, 45; 405/184, 154.1, 174; 166/50, 285, 287
See application file for complete search history.

(56) References Cited

U.S. PATENT DOCUMENTS

| | | | |
|---|---|---|---|
| 3,894,402 A | 7/1975 | Cherrington | |
| 3,996,758 A * | 12/1976 | Cherrington | E21B 7/046 405/184 |
| 4,101,114 A * | 7/1978 | Martin | H02G 1/081 254/134.3 FT |
| 4,137,623 A * | 2/1979 | Taylor | B05C 1/06 118/205 |
| 4,232,981 A * | 11/1980 | Lee | F16L 1/028 405/158 |
| 4,275,096 A * | 6/1981 | Taylor | B05C 1/06 118/105 |
| 4,319,648 A | 3/1982 | Cherrington | |
| 4,401,170 A * | 8/1983 | Cherrington | E21B 7/046 175/103 |
| 4,427,480 A * | 1/1984 | Kamuro | B29C 63/36 138/140 |
| 4,445,574 A * | 5/1984 | Vann | E21B 7/04 166/268 |
| 4,475,629 A * | 10/1984 | Jonnes | F16N 7/00 118/205 |
| 4,507,019 A * | 3/1985 | Thompson | E21B 7/046 138/97 |
| 4,616,955 A * | 10/1986 | Wallace | F16L 7/00 405/158 |
| 4,679,637 A * | 7/1987 | Cherrington | E21B 7/18 175/61 |
| 4,756,510 A * | 7/1988 | Klamm | G02B 6/4464 254/134.4 |
| 4,768,024 A * | 8/1988 | Hauff | H02G 3/22 340/584 |
| 4,785,885 A * | 11/1988 | Cherrington | E21B 7/046 166/285 |
| 5,090,737 A | 2/1992 | Brammer et al. | |
| 5,112,158 A * | 5/1992 | McConnell | F16L 55/1658 405/184.3 |
| 5,238,225 A * | 8/1993 | Hunt | E02F 5/10 242/392 |
| 5,241,993 A * | 9/1993 | Stephens | C04B 38/106 138/97 |
| 5,269,384 A * | 12/1993 | Cherrington | E21B 7/28 175/102 |
| 5,343,950 A | 9/1994 | Hale et al. | |
| 5,366,030 A * | 11/1994 | Pool, II | E21B 17/18 175/215 |
| 5,375,669 A * | 12/1994 | Cherrington | E21B 7/28 175/102 |
| 5,456,552 A * | 10/1995 | Cherrington | E21B 7/28 175/391 |
| 5,476,142 A | 12/1995 | Kajita | |
| 5,516,080 A * | 5/1996 | McVaugh | H02G 1/06 254/134.3 FT |
| 5,586,580 A * | 12/1996 | Fisk | F16L 55/124 138/108 |
| 6,109,832 A * | 8/2000 | Lincoln | F16L 55/1658 175/53 |
| 6,196,766 B1 * | 3/2001 | Graham | E02F 5/10 175/53 |
| 6,269,889 B1 * | 8/2001 | Wentworth | E21B 4/145 173/19 |
| 6,502,636 B2 | 1/2003 | Chatterji et al. | |
| 6,536,463 B1 | 3/2003 | Beals et al. | |
| 6,906,010 B2 | 6/2005 | Hoy | |
| 6,979,776 B1 | 12/2005 | Zimmerman | |
| 7,757,765 B2 | 7/2010 | Hilleary et al. | |
| 7,878,270 B2 | 2/2011 | Lee et al. | |
| 7,963,722 B2 * | 6/2011 | Kogler | E21B 7/20 405/184 |
| 7,976,243 B2 * | 7/2011 | Rohde | E21B 7/046 405/184 |
| 8,006,761 B2 | 8/2011 | Duncum et al. | |
| 8,596,916 B2 * | 12/2013 | Rohde | F16L 1/036 405/184 |
| 9,085,945 B2 | 7/2015 | Heieie | |
| 9,660,426 B1 * | 5/2017 | Krimple | H02G 1/06 |
| 9,733,446 B1 * | 8/2017 | Haagenson | E03B 7/10 |
| 2002/0081154 A1 * | 6/2002 | Herrick | F16L 55/18 405/184 |
| 2002/0081156 A1 * | 6/2002 | Coon | F16L 55/1658 405/184.1 |
| 2002/0162406 A1 * | 11/2002 | Wentworth | E03F 7/12 73/865.8 |
| 2003/0017008 A1 * | 1/2003 | Robinson | F16L 55/1658 405/184.3 |
| 2003/0066684 A1 | 10/2003 | Klemm | |
| 2004/0184885 A1 | 9/2004 | McGillis | |
| 2005/0061549 A1 * | 3/2005 | Evans | E21B 44/005 175/62 |
| 2005/0194578 A1 * | 9/2005 | Morris | G02B 6/4459 254/134.3 FT |
| 2006/0088384 A1 * | 4/2006 | Putnam | F16L 55/18 405/184.1 |
| 2006/0124360 A1 * | 6/2006 | Lee | E21B 43/305 175/61 |
| 2007/0227404 A1 | 10/2007 | Plank et al. | |
| 2008/0124178 A1 * | 5/2008 | Rohde | E21B 7/046 405/184.5 |
| 2008/0286051 A1 | 11/2008 | Duggan | |
| 2009/0092173 A1 * | 4/2009 | Glombitza | G01K 11/32 374/161 |
| 2009/0278321 A1 * | 11/2009 | Skinner | F16L 55/163 277/607 |
| 2010/0178113 A1 * | 7/2010 | Tjader | E21B 7/205 405/184.3 |
| 2011/0079469 A1 * | 4/2011 | Tjader | F16L 55/1658 184/14 |
| 2012/0247766 A1 * | 10/2012 | Hemmings | C04B 28/082 166/285 |
| 2013/0014992 A1 * | 1/2013 | Sharp | E21B 7/002 175/45 |
| 2014/0014341 A1 | 1/2014 | Hathcox et al. | |
| 2014/0190686 A1 | 7/2014 | Cannan et al. | |
| 2015/0197033 A1 * | 7/2015 | Agapiou | B28B 1/24 264/299 |
| 2015/0232785 A1 | 8/2015 | Paullin et al. | |
| 2016/0002521 A1 | 1/2016 | Dillon et al. | |
| 2016/0334048 A1 * | 11/2016 | Ambler | B09B 3/0066 |
| 2018/0038093 A1 * | 2/2018 | Olsson | E03C 1/302 |
| 2018/0245726 A1 * | 8/2018 | Carter | F16L 55/1658 |
| 2018/0266616 A1 * | 9/2018 | Thompson | F16L 55/163 |
| 2018/0331518 A1 | 11/2018 | Parker | |
| 2019/0074671 A1 * | 3/2019 | Zhao | H02G 1/081 |

FOREIGN PATENT DOCUMENTS

| | | |
|---|---|---|
| CN | 1872945 A | 12/2006 |
| CN | 102250597 B | 5/2013 |

(56) References Cited

FOREIGN PATENT DOCUMENTS

| | | |
|---|---|---|
| CN | 104213833 B | 8/2016 |
| CN | 104534167 B | 8/2016 |
| CN | 205724799 U | 11/2016 |
| DE | 102015001853 A1 | 8/2016 |
| EP | 1002932 B1 | 9/2004 |
| EP | 1903015 A1 | 3/2008 |
| GB | 2312995 A | 11/1997 |
| GB | 2356679 B | 1/2004 |
| JP | 5369340 B1 | 9/2013 |
| KR | 20160001105 A | 1/2016 |
| WO | 2010065634 A2 | 6/2010 |
| WO | 2010121027 A2 | 10/2010 |
| WO | 2017032457 A1 | 3/2017 |

OTHER PUBLICATIONS

Halliburton, Bore-grout Spec Sheet, 2011, 2 pages, published by Halliburton, Houston, US.

Dugan, George, HDD Drilling Fluids: Mixed Metal Oxide (MMO), National Driller, Nov. 2017, 1 page.

Copenheaver, Blaine R., International Search Report for PCT/US2020/043069, dated Oct. 14, 2020, 2 pages, ISA/US, Alexandria, Virginia.

Copenheaver, Blaine R., Written Opinion of the International Searching Authority for PCT/US2020/043069, dated Oct. 14, 2020, 7 pages, ISA/US, Alexandria, Virginia.

Mi Swaco a Schlumberger Company, DRILPLEX, 2 pages, 2004, miswaco.com, Houston, Texas.

* cited by examiner

REPURPOSING PIPELINE FOR ELECTRICAL CABLE

STATEMENTS REGARDING FEDERALLY SPONSORED RESEARCH OR DEVELOPMENT

Not Applicable.

NAMES OF THE PARTIES TO A JOINT RESEARCH AGREEMENT

Not Applicable.

TECHNICAL FIELD

The disclosure relates to the field of electric power infrastructure; existing oil and gas pipeline, or other pipelines which are no longer in use for their original purpose; for installation of conduits and electrical cables/conduits, typically underground, for electric power transmission; and the ampacity of electrical cables.

BACKGROUND

Installation of electrical lines or cables/conduits or transmission lines underground has traditionally involved costly, extensive trenching/excavation over long distances and subsequent burying of electrical lines or cables/conductors. Therefore, installing underground electrical lines or cables/conduits has not been practical or feasible in many instances due to the very prohibitive costs associated with trenching and burying the electrical lines; instead, overhead transmission lines/systems or cables have been erected or maintained.

BRIEF SUMMARY

The present disclosure generally relates to embodiments of methods for repurposing a pipeline for electrical cables/conduits or electrical power lines. More specifically, the disclosure relates to the field of electric power infrastructure and repurposing existing oil and gas pipeline, or other pipelines which are no longer in use for their original purpose, for installation of conduits and electrical cables/conduits, typically underground, for electric power transmission.

Additionally, the present disclosure relates to embodiments of a thixotropic non-cementitious thermal grout and methods of use with cables/conduits or electrical power lines.

Additionally, the present disclosure relates to embodiments of an apparatus utilizing an existing underground pipeline.

The meaning of transmission is hereby defined to include electrical distribution.

The meaning of repurposing is hereby defined to include reusing, renewing, recycling, restoring, and/or remodeling.

The meaning of hot spot is hereby defined to include a high temperature area or location of high/maximum thermal stress caused by ineffective heat dissipation in an electrical cable and may be somewhat dependent upon location of and/or quality/condition of an electrical cable splice.

BRIEF DESCRIPTION OF DRAWINGS

The embodiments may be better understood, and numerous objects, features, and advantages made apparent to those skilled in the art by referencing the accompanying drawings. These drawings are used to illustrate only typical embodiments of this invention, and are not to be considered limiting of its scope, for the invention may admit to other equally effective embodiments. The figures are not necessarily to scale and certain features and certain views of the figures may be shown exaggerated in scale or in schematic in the interest of clarity and conciseness.

DETAILED DESCRIPTION OF EXEMPLARY EMBODIMENTS

The description that follows includes exemplary apparatus, methods, techniques, and instruction sequences that embody techniques of the inventive subject matter. However, it is understood that the described embodiments may be practiced without these specific details.

Figure 1:
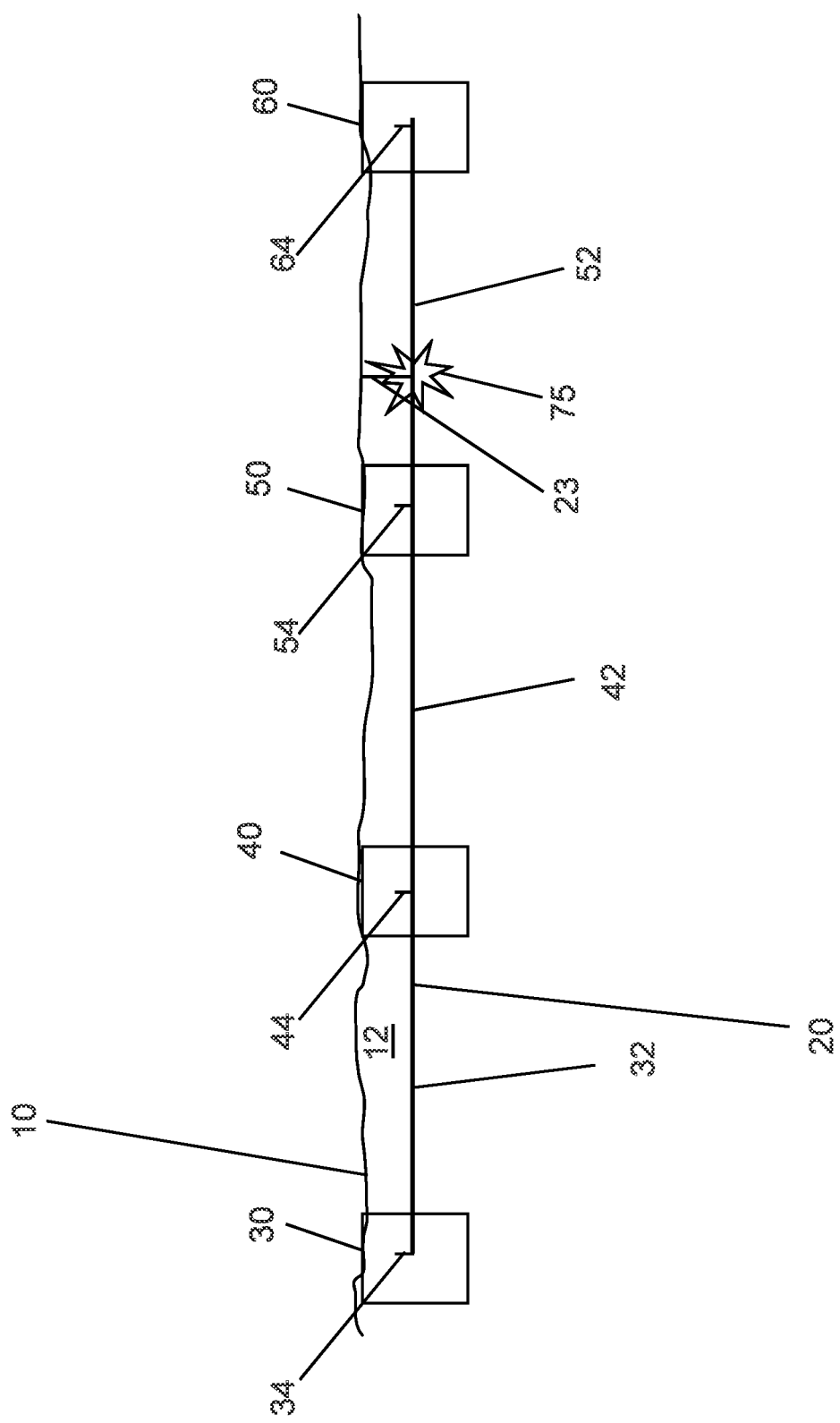
FIG. 1 depicts a sectional schematic view of an exemplary embodiment of a portion of an existing underground pipeline being repurposed for electrical cable/conductor/conduit.
Figure 3:
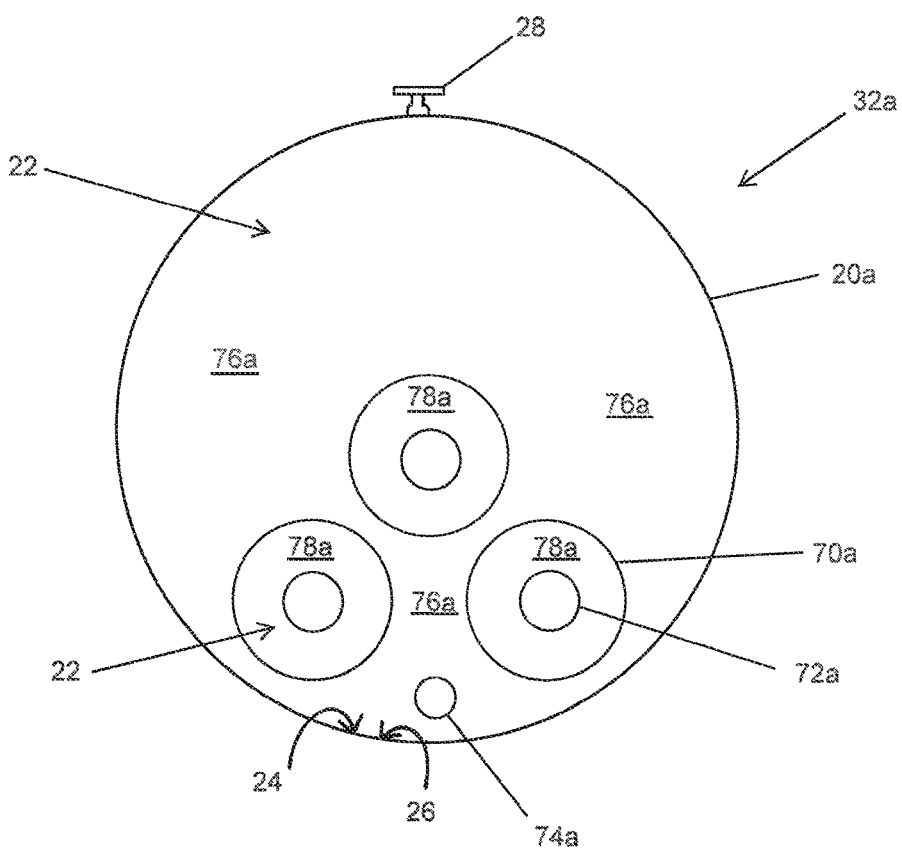
FIG. 3 depicts a sectional schematic view of an exemplary embodiment of a repurposed existing underground pipeline having conduit, cable, and sensing fiber installed for a High Voltage Alternating Current (HVAC) transmission system.
Figure 4:
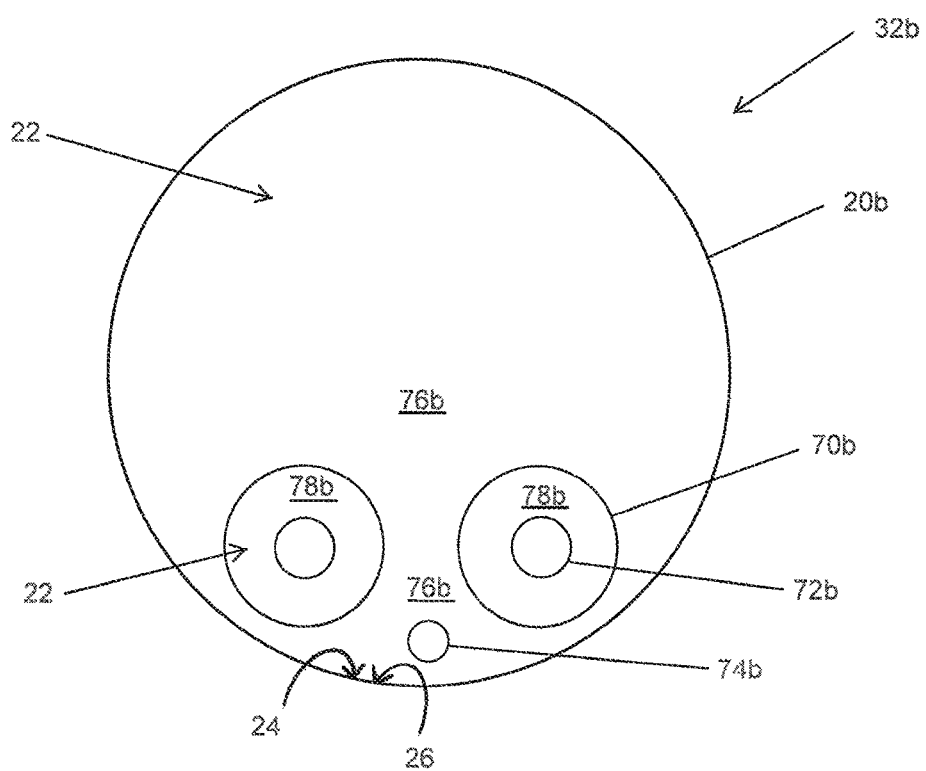
FIG. 4 shows a sectional schematic view of an exemplary embodiment of a repurposed existing underground pipeline having conduit, cable, and sensing fiber installed for a High Voltage Direct Current (HVDC) transmission system.

FIG. 1 shows a sectional schematic view of an exemplary embodiment of a portion of an existing underground oil and gas pipeline 20 being repurposed for electrical cable/conductor (shown in FIGS. 3 and 4). Existing pipeline 20 may typically be underground or in an underground environment 12 beneath the ground surface 10. Existing pipeline being repurposed may be existing oil and gas pipeline, or other pipelines which are no longer in use for their original purpose. By way of example only, other existing underground pipelines which are no longer in use may be repurposed for electrical cable/conductor/conduit, for example, existing original purpose oil pipeline, existing original purpose gas pipeline, or existing original purpose water pipeline.

Existing pipeline 20 may be cleaned, if needed, which may include evacuating contents. Cleaning may utilize one or more pigs. A cleaning pig may be, by way of example only, a foam pig. Evacuation of contents beyond cleaning may be performed.

Existing pipeline 20 may be evaluated/inspected for damage or defects and bends that may be prohibitive of or problematic for installation of conduits or electrical cable/conductor. Evaluation or inspection may utilize one or more pigs and/or smart or intelligent pigs. By way of example only, evaluation or inspection may utilize a GPS (global positioning satellite) mapping pig. Evaluation or inspection may involve caliper tools, geometry survey tools, and/or mapping tools. Evaluation or inspection may measure pipeline geometry, configuration, and/or internal diameter, and may detect, locate and measure dents, ovality, buckles, wrinkles, openings, weak spots, degradation, corrosion, and/or other geometry defects of the pipeline 20.

The installation of electrical cable/conductor (shown, e.g., in FIGS. 3-6) and conduit (shown, e.g. in FIGS. 3-6) into the pipeline 20 may be designed. Designing may include mapping and/or modelling of the installation process and/or final location/orientation of the electrical cable/conductor or conduit or infrastructure. Designing may include the design of repair or replacement of pipeline in a section where the pipeline has defects or damage, or a bend or turn which does not accommodate installation of electric cable/conductor and/or conduit.

The existing pipeline 20 may be cut at cuts 34, 44, 54, 64 at intervals or lengths 32, 42, 52 which may depend upon the weight of the electrical cable and/or the diameter of spools or reels 140 that can be transported. The distance of the length or interval or span 32, 42, 52 may depend upon length of cable per reel, topography/geology, and/or information in the nature of environmental restrictions. By way of example only, the interval or lengths may be defined as having a length within the range of about 2000 ft. to about 3000 ft. Pits or splice pits 30, 40, 50, 60 may be dug at periodic locations in the ground 10 along the path of the pipeline 20. The distance of the length or intervals or spans 32, 42, 52 of pipeline 20 between cuts 34, 44, 54, 64 may depend upon the weight of the electrical cable or the material and/or type of electrical cable and/or conduit. By way of example only, the electrical transmission system may be a HVAC (High Voltage Alternating Current) system or a HVDC (High Voltage Direct Current) system. By way of example only, for aluminum electrical cable for an HVDC system, the cuts 34, 44, 54, 64 in the pipeline 20 may occur at lengths 32, 42, 52 of about 3000 ft. Aluminum electrical cable may be less likely than copper to lend itself to the implementation of thermal grout (i.e. air may fill the annulus, or if desired, thermal grout). By way of example only, for copper electrical cable for an HVDC, the cuts in the pipeline may occur at lengths of about 2000 ft. Copper electrical cable may lend itself more to the implementation of thermal grout as described herein and incorporated by reference. By way of example only, the electrical cable insulation/type may be cross linked polyethylene (XLPE). By way of example only, conduit may be plastic, such as high density polyethylene (HDPE) or polyvinylchloride (PVC), which may be FUSIBLE PVC piping/conduit of Underground Solutions, Inc. commercially available from UNDERGROUND SOLUTIONS, an AEGION company.

A pipeline traveler may be moved through the pipeline 20 at the location of a cut 34 across a length, interval, or span 32 to the next consecutive cut 44 or interval 42. The pipeline traveler may be detached and a traveler line attached to conduit. Conduit may be pulled through the pipeline 20. Electrical cable may be pulled through/into the conduit. By way of example only, in one preferred embodiment, a pipeline traveler may be a pipeline pig such as those available from Quanta Inline Devices, LLC.

Figure 2:
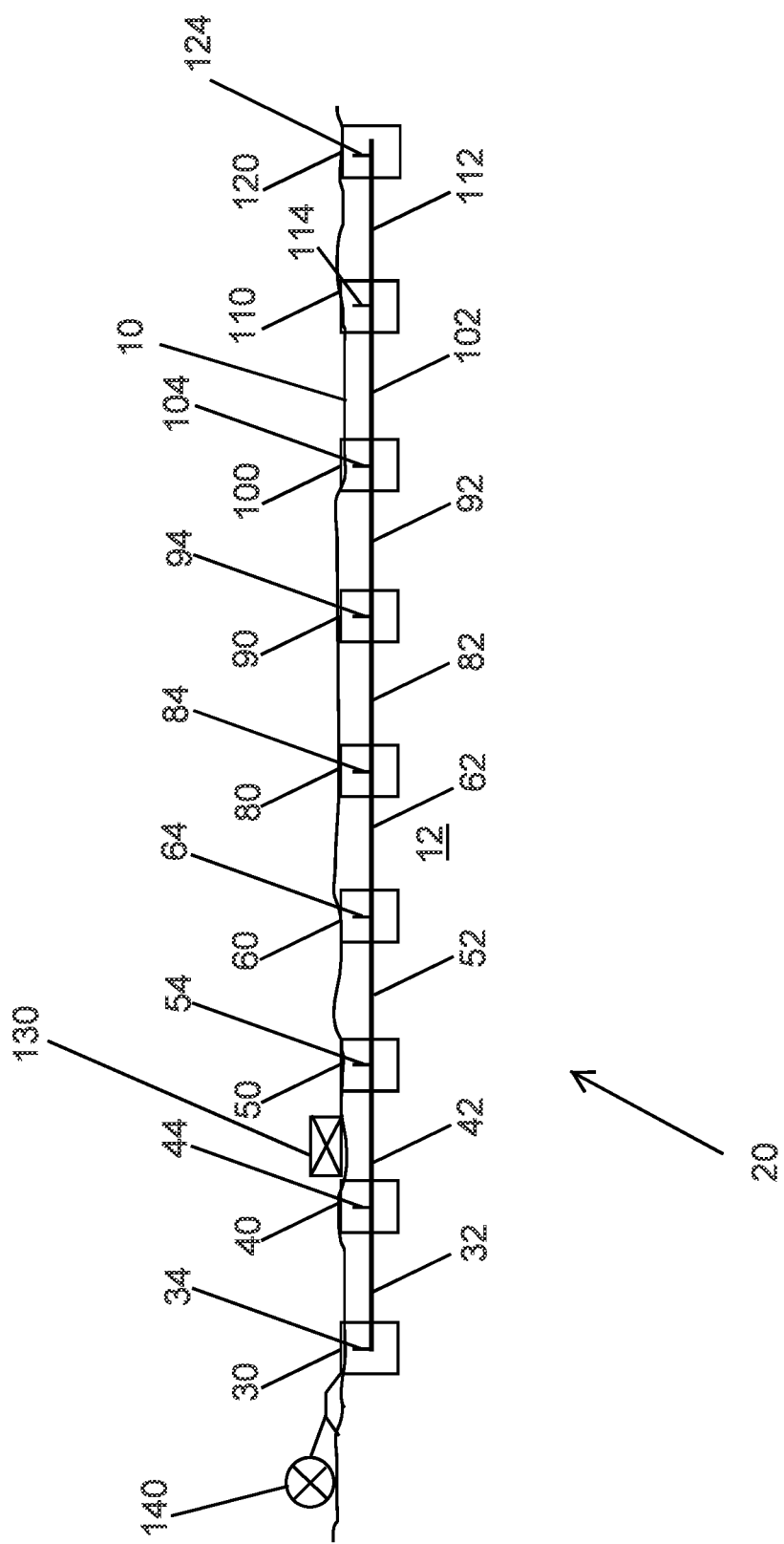
FIG. 2 shows a sectional schematic view of an exemplary embodiment of a portion of an existing underground pipeline being repurposed for electrical cable/conductor/conduit.

FIG. 2 shows an exemplary embodiment of a portion of an existing underground oil and gas pipeline 20 being repurposed for electrical cable/conductor/conduit (shown, e.g., in FIGS. 3 and 4). Existing pipeline 20 may typically be underground or in an underground environment 12 beneath the ground surface 10. In this exemplary embodiment, a pipeline interval, length, or span 32 is pipeline pigged from cut 44 to pipeline cut 34 (See, e.g., FIG. 8) Pig line 134 is detached from the pipeline pig 132 and attached to conduit. Conduit is pulled by puller 130, which is proximate pit or splice pit 40 or cut 44, through length 32 of pipeline 20 from cut 34 to cut 44. Pipeline interval, length, or span 42 is pipeline pigged from cut 44 to cut 54. Conduit is pulled by puller 130 through length 42 of pipeline 20 from cut 54 to cut 44. Cable is pulled through conduit in length 32 of pipeline 20 from cut 34 to cut 44. Cable is pulled through conduit in length 42 of pipeline 20 from cut 54 to cut 44. The puller 130 may be moved proximate pit or splice pit 60 or cut 64, and the process of pigging, pulling conduit, and pulling cable may occur through length 52 and length 62 of pipeline 20. The process of pigging, pulling conduit, and pulling cable may repeat for the length of the pipeline 20. Pulling conduit through a pipeline and pulling electrical cable through/into the conduit may be performed separately and/or consecutively, or may be unitarily combined into a single step. The conduit and cable may be pulled in the same direction or opposite or different directions. It is preferred that conduit is pulled into a span or length of pipeline 20 first, and then cable is pulled into conduit. A sensing fiber wire 74a/b (shown in FIGS. 3-6) may also be installed or pulled into the pipeline in order to sense any 'hot spot(s)' 75 (e.g., see FIG. 1) in the system. Should a 'hot spot' 75 be sensed anywhere along the length of the existing pipeline 20, then an operator may cut out/create an opening/broach (to a create and access void for) 23 to and through the pipeline 20 to the 'hot spot' 75 (for example, from the ground surface 10 directly above the region where sensed) and splice as needed according to the embodiments and methodology disclosed herein at or proximate the location or region of the sensed 'hot spot'. By way of example only, should a hot spot 75 be identified/sensed by the fiber optic system, the hot spot 75 may be remediated, relieved, or fixed via addition of a volume of thixotropic non-cementitious thermal grout 22 at or proximate the location or region of the sensed hot spot 75 via the opening/void 23. Hot spots 75 may have a greater propensity to occur in regions where the electrical cable/conductor 72a/b are spliced.

Consecutive lengths, e.g., 32, 42, of cable may be spliced at the pits or splice pits, e.g., 42, to form a continuous electrical line or transmission line. Consecutive conduits may be joined, fastened, or fused. FIG. 2 shows pits or splice pits 30, 40, 50, 60, 80, 90, 100, 110, and 120. FIG. 2 shows cuts 34, 44, 54, 64, 84, 94, 104, 114, and 124. FIG. 2 shows lengths or intervals or spans 32, 42, 52, 62, 82, 92, 102, and 112.

FIG. 3 shows a sectional schematic view of an exemplary embodiment of a repurposed existing underground pipeline 20a span 32a having conduit 70a, three cables 72a, and sensing fiber optic line 74a installed for a High Voltage Alternating Current (HVAC) transmission system. The space or annular space 76a between the pipeline 20a and the conduits 70a may be occupied by air. The space or annular space 78a between the conduits 70a and the cable 72a may be occupied by air. In one exemplary embodiment, a volume of thixotropic, non-cementitious thermal grout 22 may be added to the space in the pipeline 76a and/or the space in the conduits 78a to facilitate heat or thermal dissipation (i.e. via thermally conducting heat from the electrical cable 72a/b through the physical medium of the thixotropic, non-cementitious thermal grout 22). The thixotropic, non-cementitious thermal grout 22 may facilitate or increase the ampacity of the high voltage electrical cable up to, by way of example, about 20%. The thixotropic, non-cementitious thermal grout 22 may be added into a particular length, span, interval, segment or segment(s) 32a of pipeline 20a and/or conduit 70a, or may be added to other lengths, spans, intervals, segment or segment(s)(not shown), or may be added into the full length of continuous pipeline 20a or conduit 70a. In one embodiment, by way of example only, thixotropic, non-cementitious thermal grout 22 may be added into pipeline 20a and/or conduit 70a proximate the location of a detected hot spot or proximate splice locations/points.

FIG. 4 shows a sectional schematic view of an exemplary embodiment of a repurposed existing underground pipeline 20b span 32b having conduit 70b, two cables 72b, and sensing fiber optic line 74b installed for a High Voltage Direct Current (HVDC) transmission system. The space or annular space 76b between the pipeline 20b and the conduits 70b may be occupied by air. The space or annular space 78b between the conduits 70b and the cable 72b may be occupied by air. In one exemplary embodiment, a volume of thixotropic, non-cementitious thermal grout 22 may be added to the space in the pipeline 76b and/or the space in the conduits 78b to facilitate heat or thermal dissipation (i.e. via thermally conducting heat from the electrical cable 72a/b through the physical medium of the thixotropic, non-cementitious thermal grout 22). The thixotropic, non-cementitious thermal grout 22 may facilitate or increase the ampacity of the high voltage electrical cable up to about 20%. The thixotropic, non-cementitious thermal grout 22 may be added into a particular length, span, interval, segment or segment(s) 32b of pipeline 20b and/or conduit 70b, or may be added to other lengths, spans, intervals, segment or segment(s)(not shown), or may be added into the length of continuous pipeline 20b or conduit 70b. In one embodiment, by way of example only, thixotropic, non-cementitious thermal grout 22 may be added into pipeline 20b and/or conduit 70b proximate the location of a detected hot spot or proximate splice locations/points to eliminate of alleviate the detected hot spot.

Figure 5:
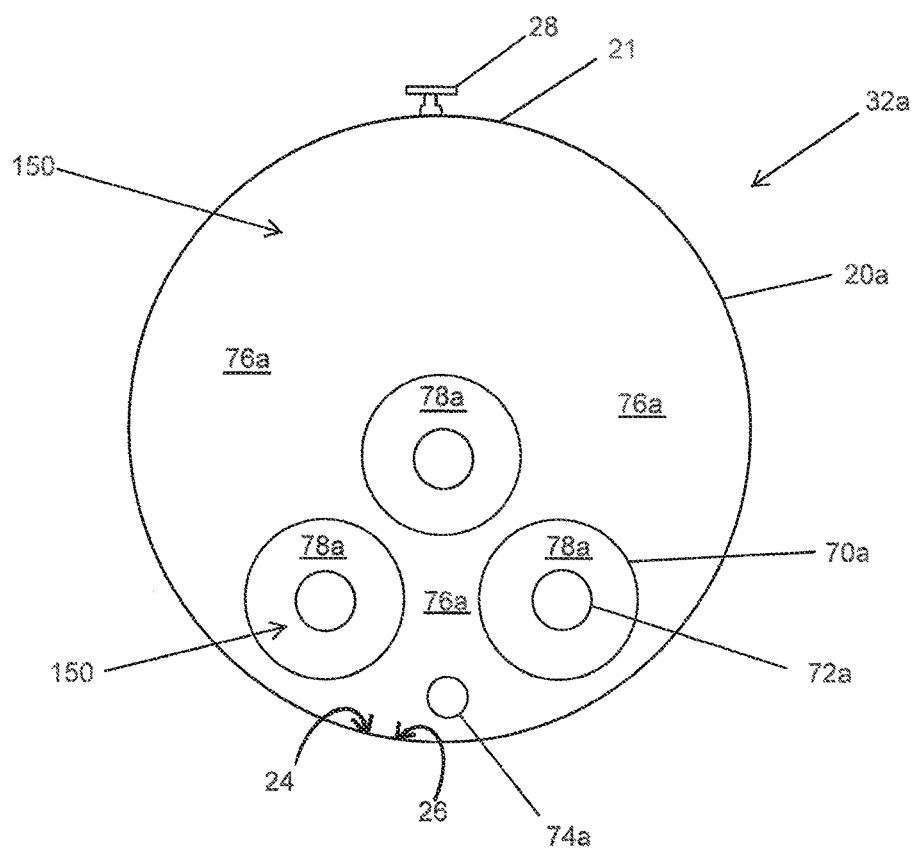
FIG. 5 depicts a sectional schematic view of an exemplary embodiment of a repurposed existing underground pipeline having conduit, cable, and sensing fiber installed for a High Voltage Alternating Current (HVAC) transmission system.

FIG. 5 shows a sectional schematic view of an exemplary embodiment of a repurposed existing underground pipeline 20a span 32a having conduit 70a, three cables 72a, and sensing fiber optic line 74a installed for a High Voltage Alternating Current (HVAC) transmission system. The space or annular space 76a between the pipeline 20a and the conduits 70a may be occupied by air 150. The space or annular space 78a between the conduits 70a and the cable 72a may be occupied by air 150. By way of example only, when a cable 72a conductor is aluminum, the space or annular space 76a between the pipeline 20a and the conduits 70a may be occupied by air 150 and/or the space or annular space 78a between the conduits 70a and the cable 72a may be occupied by air 150.

Figure 6:
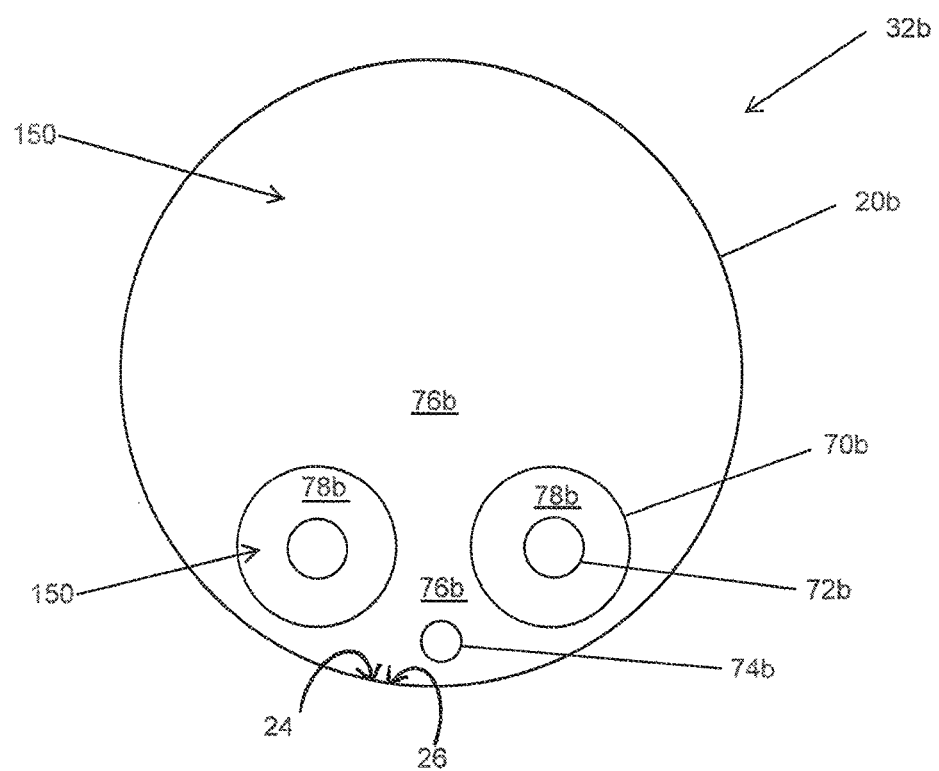
FIG. 6 shows a sectional schematic view of an exemplary embodiment of a repurposed existing underground pipeline having conduit, cable, and sensing fiber installed for a High Voltage Direct Current (HVDC) transmission system.

FIG. 6 shows a sectional schematic view of an exemplary embodiment of a repurposed existing underground pipeline 20b span 32b having conduit 70b, two cables 72b, and sensing fiber optic line 74b installed for a High Voltage Direct Current (HVDC) transmission system. The space or annular space 76b between the pipeline 20b and the conduits 70b may be occupied by air 150. The space or annular space 78b between the conduits 70b and the cable 72b may be occupied by air 150. By way of example only, when a cable 72a conductor is aluminum, the space or annular space 76a between the pipeline 20a and the conduits 70a may be occupied by air 150 and/or the space or annular space 78a between the conduits 70a and the cable 72a may be occupied by air 150.

Figure 7:
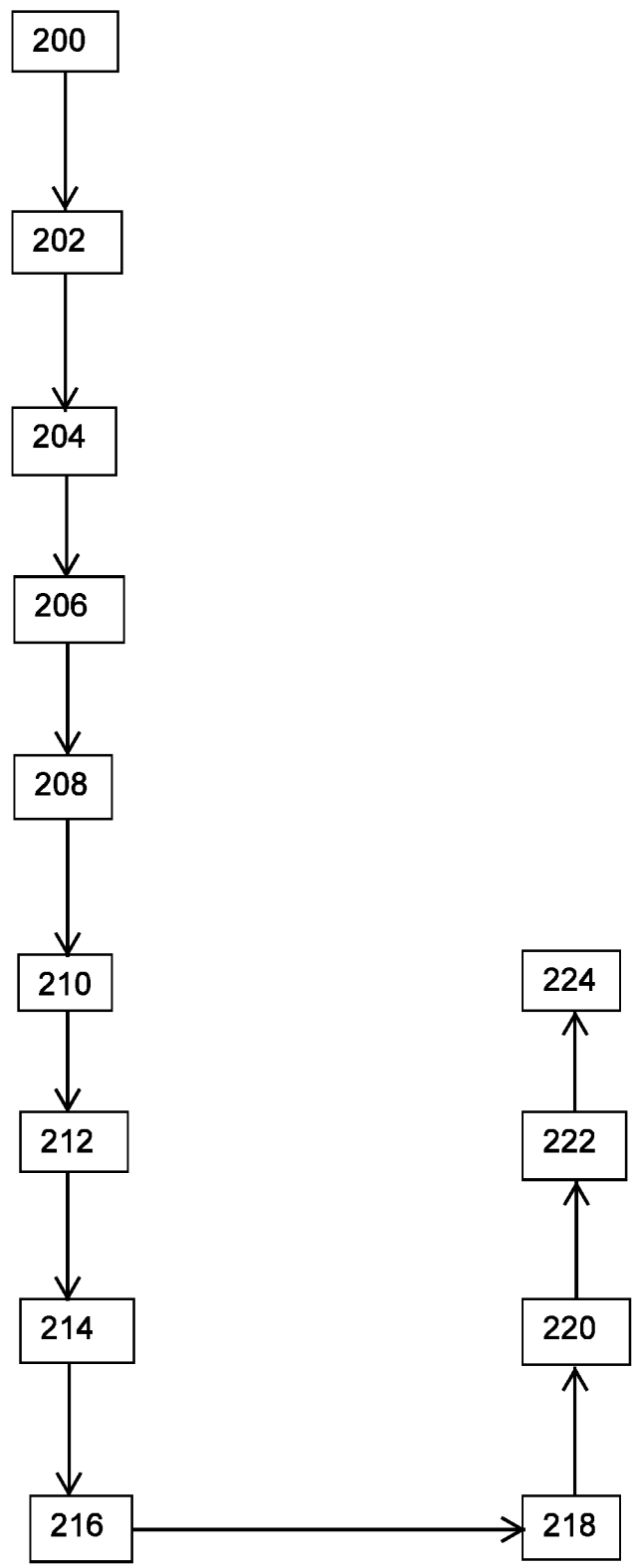
FIG. 7 depicts a flowchart of an exemplary method for repurposing an existing pipeline for introduction of electrical power lines.

FIG. 7 depicts a flowchart of an exemplary method for repurposing an existing pipeline 20 for introduction of electrical power lines 72a/b. The method may have three or more of the following optional steps amongst, and not necessarily in the sequence shown: cleaning the existing pipeline 200; evaluating/inspecting the existing pipeline 20 for damage and bends 202; designing installation of the electrical power lines through the existing pipeline 204; wherein the step of evaluating/inspecting the existing pipeline for damage and bends in the existing pipeline may include calipering and mapping the existing pipeline 206; cutting the existing pipeline 208; moving a pipeline traveler 132 through the existing pipeline to the next consecutive interval 210; detaching the pipeline traveler and attaching a pipeline traveler line 134 to a conduit 212; pulling the conduit 70 through the existing pipeline and pulling an electrical cable 72 into and through the conduit 214; adding a volume of a thixotropic non-cementitious thermal grout 22 to a space defined between the existing pipeline and the conduit and/or between the conduit and the electrical cable 216; dissipating heat from the electrical cable by adding a medium inside the existing pipeline 218; pulling a fiber optic line 74 into the conduit 220; sensing for a hot spot 75 in the electrical cable pulled into the existing pipeline 222; and/or remediating the hot spot by adding a volume of a thixotropic non-cementitious thermal grout 224. By way of example only, pulling the conduit through the existing pipeline and pulling an electrical cable into and through the conduit may occur separately. By way of example only, pulling an electrical cable into and through the conduit may occur consecutively after pulling the conduit through the pipeline. By way of example only, pulling the conduit through the existing pipeline and pulling an electrical cable into and through the conduit may be performed unitarily combined into a single step.

Figure 8:
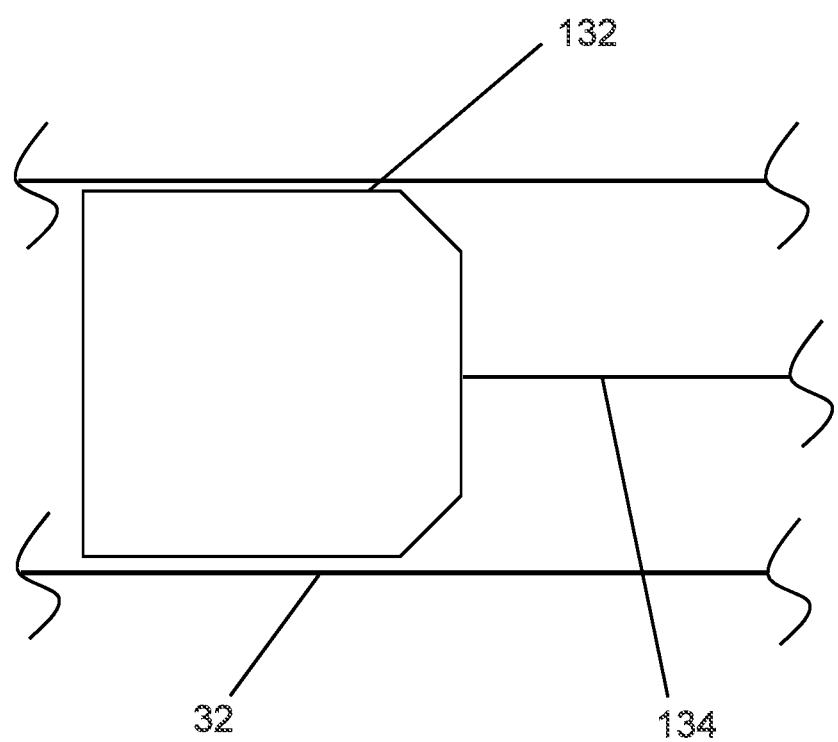
FIG. 8 depicts a sectional schematic view of an exemplary embodiment of a portion of an existing underground pipeline of FIG. 1 being repurposed for electrical cable/conductor/conduit.

FIG. 8 depicts a sectional schematic view of an exemplary embodiment of a portion of an existing underground pipeline of FIG. 2 being repurposed for electrical cable/conductor/conduit. A pipeline traveler 132 is moving through length or span or interval 32 of existing pipeline 20. Pipeline traveler 132, which may be a pig 132a, is connected to pipeline traveler line or pig line 134.

In one exemplary embodiment, an apparatus utilizing an existing underground pipeline may comprise at least two conduits 70a, 70b installed inside the existing underground pipeline 20a, 20b, a fiber optic line 74a, 74b installed inside the existing underground pipeline 20a, 20b, and at least two electrical cables 72a, 72b respectively installed inside the two conduits 70a, 70b. By way of example only, an electrical cable or length of electrical cable 72a, 72b may not reside or be positioned in conduit 70a, 70b. By way of example only, an electrical cable or length of electrical cable 72a, 72b may not reside in conduit 70a, 70b at splicing and/or access junctions.

In one exemplary embodiment, an apparatus utilizing an existing pipeline may further comprise a thixotropic non-cementitious thermal grout 22 filling a void 76a, 76b defined by the existing underground pipeline 20a, 20b.

In one exemplary embodiment, an apparatus utilizing an existing pipeline may further comprise a means for detecting a hot spot in communication with the fiber optic line 74a, 74b.

In one exemplary embodiment, an apparatus utilizing an existing pipeline 20 may further comprise a means for adding and/or withdrawing/removing thixotropic non-cementitious thermal grout 22.

In one exemplary embodiment, an apparatus utilizing an existing pipeline may further comprise capped access spigots or inlets/outlets 28 along the existing pipeline 20a, 20b and/or conduit 70a, 70b through a wall 21 of the existing underground pipeline 20a/b at locations above or below ground to allow addition and/or withdrawal/removal of thixotropic non-cementitious thermal grout 22. The capped access spigots 28 may be particularly beneficial as the existing pipeline will not be operated under pressure when repurposed, except or although it may contain thixotropic non-cementitious thermal grout 22. Each spigot 28 may contain a flow passage, a valve, and an actuator.

Repurposing pipeline 20 for electrical lines/infrastructure eliminates extensive excavation and many significant costs associated with traditional trenching and burying methods of installing electrical cable underground. Further, electrical cable/conduit or electric power lines in repurposed pipeline 20 require less maintenance than overhead transmission lines because they are shielded from storm and extreme weather damage. Further, a thixotropic, non-cementitious thermal grout 22 may be added and/or removed at any time to the repurposed pipeline 20 and/or conduits 70a, 70b in repurposes pipeline, as opposed to traditional cements which set permanently and must be added at initial installation for traditional trench and bury methods. Adding or removing a volume of thixotropic non-cementitious thermal grout 22 greatly improves operational flexibility and financial performance of the electrical system. By way of example only, the flexibility of thixotropic non-cementitious thermal grout 22 is advantageous for addition to/insertion or removal from the existing pipeline 20 or conduit 70a, 70b; for liquefaction during access events such as splicing, repairs, or branching; and for thermal management (such as when in solid/gelled form in the undisturbed state of a thixotropic material) provides greater economic performance/benefits, as opposed to traditional cements or concrete or other inflexible materials. Moreover, repurposing pipeline aids in meeting demand for and facilitating transmission of renewable energy.

In one exemplary embodiment, an apparatus utilizing an existing pipeline may further comprise an internal coating 24 on the existing pipeline (i.e. applied to the inside surface 26 of the existing pipeline 20). By way of example only, an internal coating 24 for the existing pipeline may be epoxy. An internal coating 24 may facilitate installation of conduit by improving or lowering the coefficient of friction. An internal coating 24 may be applied to the existing pipeline 20 in whole or in part, and may be applied after the existing pipeline 20 has been cleaned, pigged, and otherwise prepared by one having ordinary skill in the art. By way of example only, an internal coating 24 may be applied to the existing pipeline 20 prior to pulling conduit 70a, b through or into the pipeline 20.

The thixotropic non-cementitious thermal grout 22 for repurposing pipeline 20, 20a, 20b for electrical cable may have a very low viscosity and flow freely while being pumped or added or removed or when energy is being applied, have no heat of hydration, gel quickly or rest in a hardened state, after pumping stops or energy is removed/no longer added, and can return to low viscosity or be "re-liquefied" or "un-gelled" later by reapplying energy to allow removing. Due to the non-cementitious or non-setting nature of the thixotropic non-cementitious thermal grout 22, it is possible to remove ducts/pipes/cable 72a, 72b/conduit 70a, 70b/product line, etc. in the future, e.g., for maintenance, or if there is a problem with the system. As a gel the thixotropic non-cementitious thermal grout 22 resists flowing or seeping through cracks in pipe, casing or duct.

Such a thixotropic non-cementitious thermal grout 22 may have a thermal resistivity about equal to or less than 75° C.-cm/W wherein the thermal resistivity does not change or does not significantly change with time. As one example, the thermal resistivity may be about 63° C.-cm/W. As another example, the thermal resistivity may be about 65° C.-cm/W. Preferably, a thixotropic non-cementitious thermal grout 22 has a thermal resistivity which matches or substantially matches the thermal resistivity of the native soils of a project site. For example, native soils of a project site can often vary from 65 to 75° C.-cm/W. Therefore, a formulation or mix of a thixotropic non-cementitious thermal grout 22 depends upon the thermal resistivity of the native soils of a project site.

Additionally, a thixotropic non-cementitious thermal grout 22 may have an electrical conductivity that can provide or facilitate cathodic protection of a cable pipe inside a steel casing or existing pipeline 20, 20a, 20b. A thixotropic non-cementitious thermal grout 22 may have a relatively high pH (about or approximately pH 11 or higher, preferably about pH 11-12), which is preferable in mitigating corrosion or facilitating cathodic protection of steel pipelines/conduits/ducts/product lines. In the "gelled" or solid state, the thixotropic non-cementitious thermal grout 22 may not seep through a crack in the structure where the grout is located. A thixotropic non-cementitious thermal grout 22 may not dry-out, i.e. it may always remain fully saturated or substantially saturated. Further, a thixotropic non-cementitious thermal grout 22 may be used in or approved for use in environmentally sensitive areas. The density of a thixotropic non-cementitious thermal grout 22 generally depends upon sand content and, by way of example only, may preferably be about 97 pounds per cubic foot—i.e. specific gravity of about 1.6. By way of example only, the density of a thixotropic non-cementitious thermal grout 22 may be about 99 pounds per cubic foot.

A thixotropic non-setting or non-cementitious thermal grout 22 provides improvements or advantages for cable 72a, 72b installation and ampacity. By way of example only, there may be about an increase in ampacity, e.g., a 4-10% increase in ampacity rating if a thixotropic non-cementitious thermal grout 22 is added for repurposing pipeline for electrical cable installation. Even higher percentage increases to ampacity rating, for a repurposing pipeline for electrical cable installation, may occur when cables 72a, 72b/conduits 70a, 70b/ducts/product lines are shorter lengths or distances.

In one exemplary embodiment, a thixotropic non-cementitious thermal grout 22 for repurposing pipeline 20, 20a, and 20b for electrical cable 72a, 72b may be a mixture comprising a volume of sand, a volume of water, a volume of bentonite viscosifier, a volume of at least one bentonite extender, a volume of lubricant, and a volume of soda ash.

In one exemplary embodiment, a thixotropic non-cementitious thermal grout 22 for repurposing pipeline 20, 20a, 20b for electrical cable 72a, 72b may comprise a volume of frac sand at about 1629 lb./yd$^3$, a volume of water at about 982 lb./yd$^3$, a volume of bentonite viscosifier at about 43.5 lb./yd$^3$, a volume of at least one bentonite extender at about 10.3 lb./yd$^3$, a volume of lubricant at about 4.0 lb./yd$^3$, and a volume of soda ash at about 7.6 lb./yd$^3$.

In one exemplary embodiment, a thixotropic non-cementitious thermal grout 22 for repurposing pipeline 20, 20a, 20b for electrical cable 72a, 72b may have a thermal resistivity of about equal to or less than 75° C.-cm/W.

In one exemplary embodiment, a thixotropic non-cementitious thermal grout 22 for repurposing pipeline 20, 20a, and 20b for electrical cable 72a, 72b may have a pH of at least about 11.

In one exemplary embodiment, a thixotropic non-cementitious thermal grout 22 for repurposing pipeline 20, 20a, 20b for electrical cable 72a, 72b may have a pH in the range of about 11-12.

In one exemplary embodiment, a thixotropic non-cementitious thermal grout 22 for repurposing pipeline 20, 20a, and 20b for electrical cable 72a, 72b may further comprise a second bentonite extender. By way of example only, the second bentonite extender may further comprise a mixed metal oxide.

In one exemplary embodiment of a thixotropic non-cementitious thermal grout 22 for repurposing pipeline 20, 20a, 20b for electrical cable 72a, 72b, the volume of sand may be flaked frac sand.

In one exemplary embodiment of a thixotropic non-cementitious thermal grout 22 for repurposing pipeline 20, 20a, 20b for electrical cable, the frac sand may be #100 frac sand (e.g., but not limited to, white). Such a frac sand is commercially available from Erna Frac Sand, and US Silica.

In one exemplary embodiment of a thixotropic non-cementitious thermal grout 22 for repurposing pipeline 20, 20a, 20b for electrical cable, the volume of bentonite viscosifier may be MAX-GEL. MAX-GEL, brand/trademark of M-I L.L.C., is an off-the-shelf bentonite viscosifier commercially available from M-I SWACO, a Schlumberger Company. Generically MAX-GEL may be a viscosifier and namely a premium 220-bbl yield Wyoming bentonite blended with special extender. The viscosifier is capable of yielding more than twice as much viscosity as regular Wyoming bentonite.

In one exemplary embodiment of a thixotropic non-cementitious thermal grout 22 for repurposing pipeline 20, 20a, 20b for electrical cable 72a, 72b, the volume of at least one bentonite extender may be DRILPLEX. DRILPLEX, brand/trademark of M-I L.L.C., is an off-the-shelf bentonite extender commercially available from M-I SWACO, a Schlumberger Company. Generically DRILPLEX may be a bentonite extender and secondary shale stabilizer designed to give improved carrying capacity and suspending ability in water-base drilling fluids, and/or a mixed metal oxide (MMO) or contains same.

In one exemplary embodiment of a thixotropic non-cementitious thermal grout 22 for repurposing pipeline 20, 20a, 20b for electrical cable 72a, 72b, the volume of lubricant is RODEASE. RODEASE, brand/trademark of M-I L.L.C., is an off-the-shelf lubricant commercially available from M-I SWACO, a Schlumberger Company.

In one exemplary embodiment of a thixotropic non-cementitious thermal grout 22 for repurposing pipeline 20, 20a, 20b for electrical cable 72a, 72b, the grout 22 may have a density within the range of about 97 to 99 pounds per cubic foot and/or a specific gravity of about 1.6.

In one exemplary embodiment of a thixotropic non-cementitious thermal grout 22 for repurposing pipeline 20, 20a, 20b for electrical cable 72a, 72b, the grout 22 may have an electrical resistivity of about 325 Ohm-cm.

In one exemplary embodiment of a thixotropic non-cementitious thermal grout 22 for repurposing pipeline 20, 20a, 20b for electrical cable 72a, 72b, the grout 22 may have a thermal resistivity matched to the thermal resistivity of a native soil at a project site ranging from 65° C.-cm/W to 75° C.-cm/W.

In one exemplary embodiment of a thixotropic non-cementitious thermal grout 22 for repurposing pipeline 20, 20a, 20b for electrical cable 72a, 72b, the volume of grout 22 which may be added to a space 76a, 78a, 76b, 78b removes air pockets during the adding step. A thixotropic non-cementitious thermal grout 22 may have a greater than 80% fill rate or percentage, and preferably 99% or higher fill rate or percentage, or wherein greater than 80% of the desired space or void 76a, 78a, 76b, 78b to be filled contains grout (as opposed to undesirable air pockets or voids or spaces in the grout).

In one exemplary embodiment of a thixotropic non-cementitious thermal grout 22 for repurposing pipeline 20, 20a, 20b for electrical cable 72a, 72b, the volume of grout 22 which may be added to a space 76a, 78a, 76b, 78b substantially completely displaces air.

In one exemplary embodiment of a thixotropic non-cementitious thermal grout 22 for repurposing pipeline 20, 20a, 20b for electrical cable 72a, 72b, the volume of grout 22 which may be added to a space 76a, 78a, 76b, 78b effluxes for 15 seconds.

In one exemplary embodiment of a thixotropic non-cementitious thermal grout 22 for repurposing pipeline 20, 20a, 20b for electrical cable, a step of adding a volume of the grout 22 further comprises removing air pockets from the grout during the adding step.

The disclosure and content of U.S. Provisional Application No. 62/877,120 entitled 'Thixotropic Non-cementitious Thermal Grout and HDD or Trough Product Line Methods of Application' is hereby incorporated by reference. The disclosure and content of PCT application no. PCT/US2017/50219 entitled 'PULLING PRODUCT LINES UNDERGROUND UNDER OBSTACLES INCLUDING WATER BODIES' is hereby incorporated by reference.

It is understood that the present disclosure is not limited to the particular applications and embodiments described and illustrated herein, but covers all such variations thereof as come within the scope of the claims. While the embodiments are described with reference to various implementations and exploitations, it will be understood that these embodiments are illustrative and that the scope of the inventive subject matter is not limited to them. Many variations, modifications, additions and improvements are possible.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

The invention claimed is:

1. A method for repurposing an existing pipeline primarily underground for introduction of electrical power lines, comprising the steps of:
    cutting the existing pipeline;
    moving a pipeline traveler through the existing pipeline to a next consecutive interval;
    detaching the pipeline traveler and attaching a pipeline traveler line to a conduit;

pulling the conduit through the existing pipeline and pulling an electrical cable into and through the conduit; and adding a volume of a thixotropic non-cementitious thermal grout to a space defined between the existing pipeline and the conduit, wherein the volume of said thixotropic non-cementitious thermal grout comprises a mixture of a volume of sand, a volume of water, a volume of bentonite viscosifier, a volume of at least one bentonite extender, a volume of lubricant, and a volume of soda ash.

2. The method according to claim 1, further comprising the step of removing at least a portion of the volume of thixotropic non-cementitious thermal grout from the space defined between the existing pipeline and the conduit.

3. The method according to claim 1, further comprising the step of adding a volume of a thixotropic non-cementitious thermal grout to a space defined between the conduit and the electrical cable.

4. The method according to claim 3, further comprising the step of removing at least a portion of the volume of thixotropic non-cementitious thermal grout from the space between the conduit and the electrical cable.

5. A method for repurposing an existing pipeline primarily underground for introduction of electrical power lines, comprising the steps of:
cutting the existing pipeline;
moving a pipeline traveler through the existing pipeline to a next consecutive interval;
detaching the pipeline traveler and attaching a pipeline traveler line to a conduit;
pulling the conduit through the existing pipeline and pulling an electrical cable into and through the conduit; and
adding a volume of a thixotropic non-cementitious thermal grout to a space defined between the conduit and the electrical cable, wherein the volume of said thixotropic non-cementitious thermal grout comprises a mixture of a volume of sand, a volume of water, a volume of bentonite viscosifier, a volume of at least one bentonite extender, a volume of lubricant and a volume of soda ash.

6. The method according to claim 5 further comprising the step of removing at least a portion of the volume of thixotropic non-cementitious thermal grout from the space between the conduit and the electrical cable.

7. A method for repurposing an existing pipeline primarily underground for introduction of electrical power lines, comprising the steps of:
cutting the existing pipeline;
moving a pipeline traveler through the existing pipeline to a next consecutive interval;
detaching the pipeline traveler and attaching a pipeline traveler line to a conduit;
pulling the conduit through the existing pipeline and pulling an electrical cable into and through the conduit;
pulling a fiber optic line into the conduit;
sensing for a hot spot in the electrical cable pulled into the existing pipeline;
wherein the cutting step is performed at a region proximate the hot spot; and
remediating the hot spot by adding a volume of a thixotropic non-cementitious thermal grout via another cut to a void between the existing pipeline and the conduit, wherein the volume of said thixotropic non-cementitious thermal grout comprises a mixture of a volume of sand, a volume of water, a volume of bentonite viscosifier, a volume of at least one bentonite extender a volume of lubricant, and a volume of soda ash.

8. The method according to claim 1, further comprising a step selected from the group of steps consisting of; insertion or removal of the conduit, the electrical cable, and/or the fiber optic line through the volume of the thixotropic non-cementitious thermal grout; liquefaction of the volume of the thixotropic non-cementitious thermal grout; allowing the volume of the thixotropic non-cementitious thermal grout to set for thermal conduction of the electrical cables; and all of the foregoing.

* * * * *